United States Patent [19]

Collins, II

[11] 4,299,507
[45] Nov. 10, 1981

[54] TWO-PIECE CONTROLLED MOTION HINGE COUPLER JOINT

[76] Inventor: Josiah W. Collins, II, 307 E. Jackson St., P.O. Box 13, Macomb, Ill. 61455

[21] Appl. No.: 81,025

[22] Filed: Oct. 1, 1979

Related U.S. Application Data

[63] Continuation-in-part of Ser. No. 1,054, Jan. 4, 1979, abandoned.

[51] Int. Cl.³ ............... F16C 11/00; F16D 1/12; F16L 3/22
[52] U.S. Cl. ............... 403/116; 403/328; 211/199; 248/68 CB; 256/26
[58] Field of Search ............ 403/116, 344, 117, 62, 403/113, 328; 256/26, 27; 248/68 CB; 24/81 CC, 81 TC; 211/199

[56] References Cited

U.S. PATENT DOCUMENTS

| 114,519 | 5/1871 | Black | 211/199 |
|---|---|---|---|
| 160,046 | 2/1875 | Wright | 211/199 |
| 1,121,780 | 12/1914 | Vakula | 256/26 |
| 1,852,071 | 4/1932 | Becker | 403/328 X |
| 1,895,317 | 1/1933 | Genich | 403/100 |
| 2,355,742 | 8/1944 | Morehouse | 248/68 CB |
| 3,105,510 | 10/1963 | Demosthenes | 403/391 X |
| 3,214,187 | 10/1965 | Fuerst | 403/328 X |
| 3,401,951 | 9/1968 | Bloom | 403/116 X |
| 3,526,934 | 9/1970 | Owen, Sr. | 248/68 CB |
| 4,089,084 | 5/1978 | Droz | 403/116 X |

Primary Examiner—James Kee Chi
Attorney, Agent, or Firm—Harvey B. Jacobson

[57] ABSTRACT

Relative rotational movement is allowed between two longitudinally extending articulated members connected by a joint while at the same time longitudinal relative translation of the members is restrained. Each joint is composed of two substantially identical halves with each half having parallel semi-cylindrical slots provided therein cooperating with the semi-cylindrical slots of the opposite half to form cylindrical apertures for receiving the longitudinally extending articulated members. Each semi-cylindrical slot has a circumferential groove about its periphery. The grooves of cooperating semi-cylindrical slots meet to provide a complete circumferentially extending groove for receiving a pin inserted through the member received in that aperture. In this manner, rotary motion of the longitudinally extending member is allowed to a full 360°. Each half of the joint contains a raised surface and a recessed surface for cooperating with the raised and recessed surfaces of the other joint half in order to properly align the two pieces to form a complete coupler joint. The two pieces are held together by threaded connectors, such as screws, bolts, or the like.

7 Claims, 5 Drawing Figures

TWO-PIECE CONTROLLED MOTION HINGE COUPLER JOINT

CROSS-REFERENCE TO RELATED APPLICATION

This application is a continuation-in-part of U.S. application Ser. No. 1,054, filed Jan. 4, 1979, now abandoned.

BACKGROUND OF THE INVENTION

1. Field of the Invention

This invention relates to couplers and especially to couplers providing hinged rotary relative motion for articulated elements.

2. Description of Related Art

Various coupling joints have been known and used in the past. Included among these is the device shown in U.S. Pat. No. 160,046, issued Feb. 23, 1875, to Wright. Wright shows a fame held together by double rings constructed with interior circumferential grooves extending partially through the rings and having through the rings an opening by which a pin may be introduced into the uprights and grooves. The grooves serve as guides for opening and closing the sections of the frame. U.S. Pat. No. 1,895,317, issued Jan. 24, 1933, to Genich, shows an automotive jack having a two-part handle and a connector. The connector has two parallel sockets for holding the handle halves together. U.S. Pat. No. 3,105,510, issued Oct. 1, 1963, to Demosthenes, shows a coupling for a water riser pipe and an anchoring and stabilizing pipe. The coupling comprises a one-piece casting having end portions with open end bores disposed in spaced parallelism and slidably embracing the riser pipe and stabilizing pipe, respectively.

SUMMARY OF THE INVENTION

One object of the present invention is to provide an inexpensive, durable and effective coupler joint for the connection of two articulated elements.

A further object of the present invention is to provide a coupler joint which allows relative rotary motion of articulated elements, yet restricts any relative longitudinal translation of the elements.

A still further object of the present invention is to provide a coupler joint which includes a means for locking articulated elements in relation to each other.

Yet a still further object of the present invention is to provide a coupler joint which may be manufactured to allow any specified degree of rotary motion of the articulated elements.

A even further object of the present invention is to provide a coupler joint which is formed in two identical halves, which halves can be securely fastened together to form a single integral structure.

Yet another object of the present invention is to provide a hinge coupler joint formed in halves wherein each half includes raised and recessed surfaces to produce accurate alignment of the halves.

In accordance with these objects, the controlled motion hinge coupler joint of the present invention is formed in two identical pieces. Each piece contains parallel semi-cylindrical slots which cooperate with the slots of the opposite piece to form cylindrical apertures for receiving articulated elements therein. A third pair of aligned semi-cylindrical slots is also included for receiving a support member. Each of the semi-cylindrical slots has a peripherally extending groove formed in its middle to receive the extremities of a pin which extends radially through one articulated element to allow rotary motion of the element. A similar pin is positioned through the support member which is positioned in the third pair of apertures. The internal groove can be formed in any of a number of configurations to allow for complete 360° rotation of the articulated members, limit the rotation thereof, or provide a locking configuration, if desired. Furthermore, the internal groove can be made to extend totally through the wall of the individual hinge joint pieces to facilitate insertion or removal of the pin at desired times. The hinge joint pieces are firmly affixed to each other by the use of threaded connectors, such as screws, bolts, or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
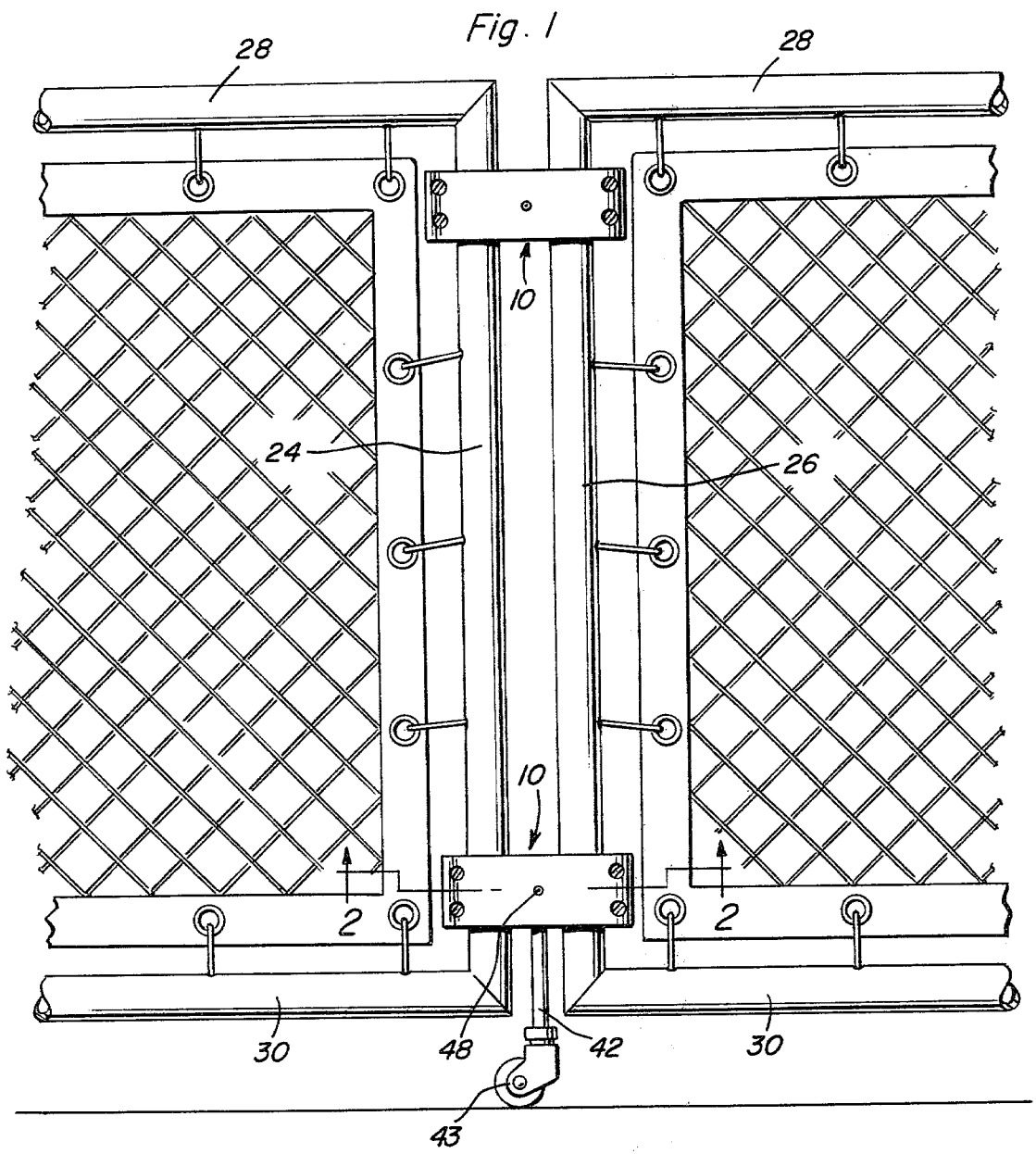
FIG. 1 is an elevational view showing two of the coupler joints of the invention connecting articulated segments of a fence.
Figure 2:
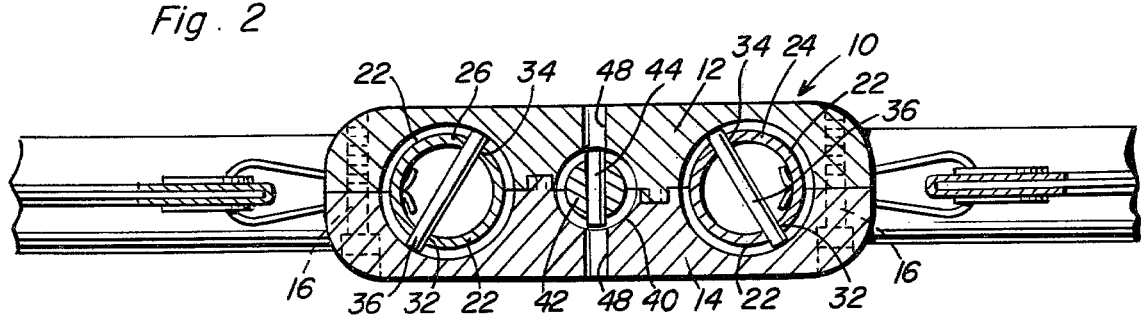
FIG. 2 is a plan sectional view taken substantially along a plane passing through section line 2—2 of FIG. 1.
Figure 3:
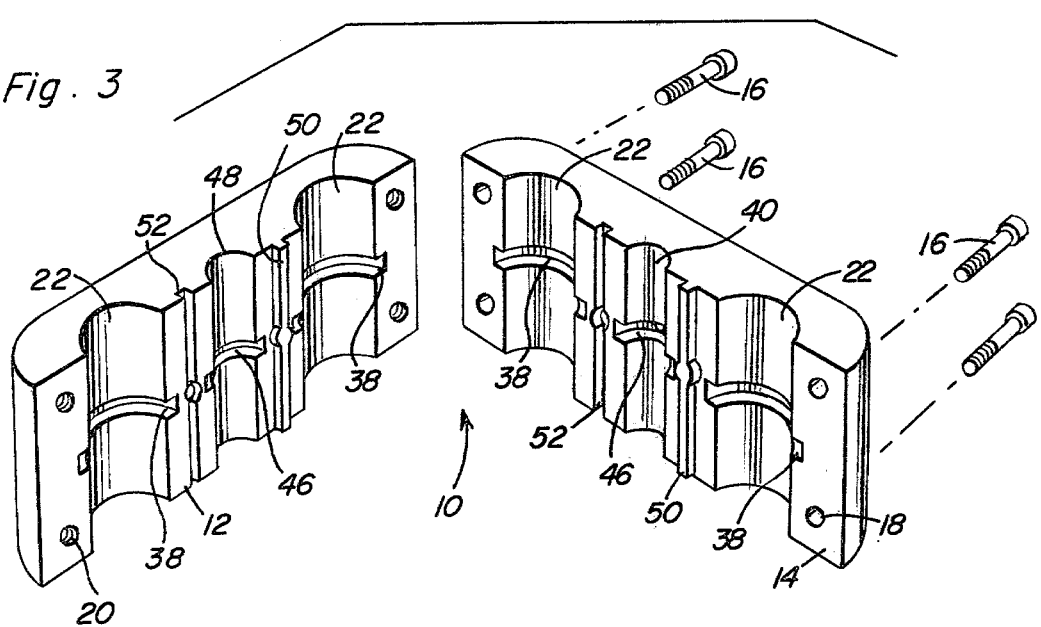
FIG. 3 is an exploded view showing in detail the elements of one of the coupler joints of the invention.

Now with reference to the accompanying drawings, two-piece controlled motion hinge coupler joint incorporating the principles and concepts of the present invention and generally designated by the reference numeral 10 will be described in detail. With specific reference to FIGS. 1 through 3, it will be seen that each joint 10 is composed of two identical halves 12 and 14 which are held together to form an integral coupler joint by the use of bolts 16 which pass through openings 18 in joint half 14 and engage threaded openings 20 of coupler half 12.

Each joint half 12, 14 includes a pair of parallel semi-cylindrical slots 22 which meet with the semi-cylindrical slots 22 of the cooperating joint half to form cylindrical apertures which receive articulated elements 24 and 26. As shown in the drawings, each of the articulated element 24 and 26 comprises a portion of the frame of a partition. This frame is shown for demonstration purposes only and forms no part of the present invention. The frame is shown to comprise horizontal members 28 and 30 which are interconnected by the elements 24 and 26. The articulated elements 24 and 26 of the frame each contain aligned holes 32 and 34 which receive a pin 36 therethrough. The ends of pins 36 extend radially away from the articulated elements and rest in a peripheral groove which extends completely about the internal circumference of the semi-cylindrical slots 22. Each peripheral groove is formed by the mating of two grooves 38 which are formed in the semi-cylindrical slots. In this manner, the pin maintains the articulated elements rotatably mounted within the hinge coupler joint and prevents relative longitudinal displacement of the elements 24 and 26. Naturally, with grooves 38 as shown, complete 360° rotation of the articulated elements themselves is allowed with this rotation being stopped only by the meeting of horizontal partition members 28 and 30. In like manner, the rotational movement of the articulated elements can be limited by forming slots 38 appropriately to allow less than full 360° rotation of the elements.

A third semi-cylindrical slot 40 is formed in each of the hinge coupler joint halves for receiving a support rod 42 which can be used to suspend the entire partition. Support rod 42 can be fixedly mounted to a support surface or can include a caster wheel 43 as shown. Again, as with the slots 22, slots 40 meet to form a cylindrical aperture which slidably receives the support rod 42. A pin 44 is passed through an opening in the support rod, with the ends of the pin being received in a peripheral groove formed of two 180° grooves 46 formed in the slots 40. In this manner, the entire partition can be supported for rotation about the support rod 42. In order to facilitate the mounting of the coupler joints on the support rod 42, a pair of apertures 48 can be formed in the walls of the coupler joint halves and aligned with the pin 44 so that the pin can be inserted and removed from the joined coupler joint halves by simply forcing the pin from its mounting within the support rod 42. Likewise, the pin 44 can easily be inserted into the support rod by inserting it into apertures 48 until the ends are aligned with the peripheral groove.

In order to insure that the halves 12, 14 are properly aligned at all times to inhibit binding of the pins 36 when being rotated through grooves 38, each joint half is provided with raised surfaces 50 and the recessed surfaces 52. The raised surface 50 of one of the joint halves is slidably received in the recessed surface 52 of the opposite half. Each of the surfaces 50, 52 includes a longitudinally extending, substantially rectangular element having a cylindrical portion formed in the center thereof. Obviously, such a surface can prevent one of the halves from sliding in any direction when received in the cooperating surface of the opposite joint half.

Figure 4:
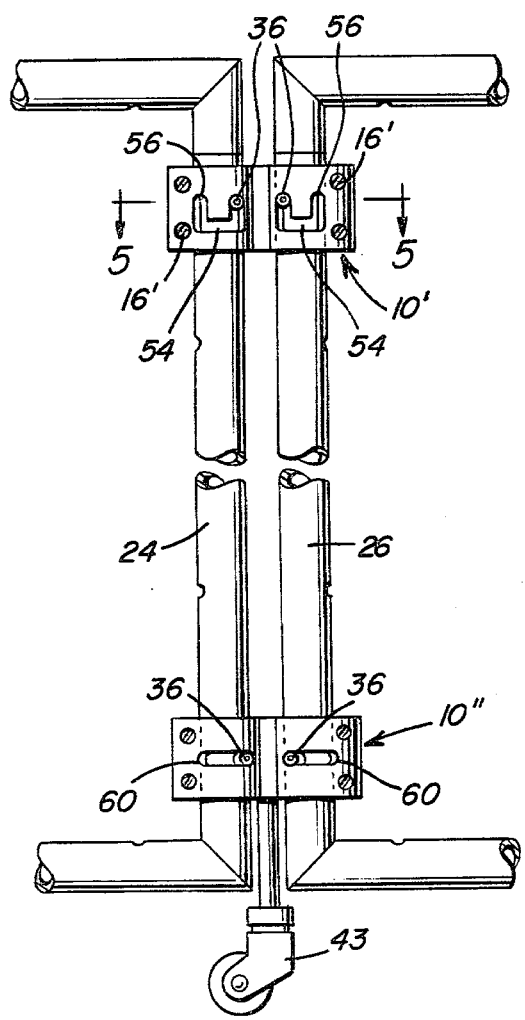
FIG. 4 is an elevational view showing one locking embodiment of the coupler joint.
Figure 5:
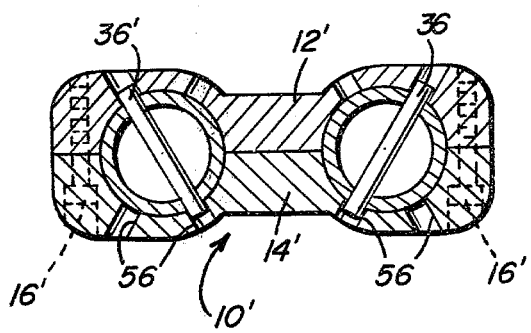
FIG. 5 is a plan sectional view taken substantially along a plane passing through section line 5—5 of FIG. 4.

FIGS. 4 and 5 show an embodiment of the coupler joint which includes a mechanism for locking the articulated members in relation to each other. This embodiment, generally referred to by reference numeral 10' includes the same basic components as coupler joint 10. Joint halves 12' and 14' are interconnected by use of bolts 16'. However, each of the halves 12', 14' includes circumferential slots 54 interconnected with axially extending slots 56. Those slots can be formed totally on the inner surface of the coupler joint halves in a manner similar to that shown in FIGS. 1 through 3, or the slots can extend entirely through the outer walls of the coupler joint halves as shown in FIGS. 4 and 5. When it is desired to lock the articulated members 24, 26 they are rotated to a position such that pins 36 are aligned with slots 56. The coupler joint is then moved axially downward resulting in the configuration as shown in FIG. 4. In this position, rotary motion of the members 24, 26 is inhibited by pins 36 contacting the side of the slots 56. It will be evident that any desired angular orientation of the member 24, 26 can be obtained by appropriately positioning slots 56 on the coupler joint 10'.

Also shown in FIG. 4 is a coupler joint 10" which is similar in construction to coupler joint 10 except that the peripheral grooves 60 extend entirely through the coupler joint halves and allow pin 36 to be visible. This embodiment of the invention allows rotary motion of the articulated elements 24 and 26 only to an extent of approximately 60°. However, the pins 36 can easily be inserted and removed through the open grooves 60. It will also be noted the locking and non-locking forms of the coupler joint can be used in conjunction as shown in FIG. 4. In this manner, the partition can be maintained at a predetermined height by supporting it on the non-locking joint and positional control can be accomplished by use of the locking joint.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A coupling device for articulated elements comprising: a body portion having two parallel apertures for accepting elements, with each aperture including a circumferentially extending groove disposed in walls associated therewith, and a pin means for insertion in said groove and through an articualted element disposed in said aperture, said coupling device further including at least two radially opposed axially extending slots in an aperture wall in communication with said circumferentially extending groove for locking the articulated elements against rotational motion, said pin means being selectively positionable within said axially extending slots to effect said locking.

2. The coupling device of claim 1 and further including an additional aperture parallel to said two apertures and connected to one end of a longitudinally extending shaft for supporting said coupling device.

3. The coupling device of claim 1 wherein each articulated element is an elongated member and further including in combination therewith a second coupling device having a body portion with two parallel apertures for accepting said articulated elements at a position spaced from the first mentioned coupling device, said second coupling device including a circumferentially extending groove disposed in walls of each aperture, and a pin means for insertion in each groove and through said articulated elements disposed in said apertures, said second coupling device serving to inhibit relative longitudinal translation of said articulated elements and said first mentioned coupling device serving to provide positions of selected fixed angular orientation of said articulated elements.

4. The coupling device of claim 1 wherein said body portion is formed in two separate halves with each of said halves having a semi-cylindrical slot formed therein, with two of said semi-cylindrical slots cooperating to form one of said apertures; and attachment means for holding two of said halves in firm engagement.

5. The coupling device of claim 4 wherein each of said halves includes alignment means for maintaining said halves in alignment when connected by said attachment means.

6. The coupling device of claim 5 wherein said alignment means includes raised and recessed surfaces on said halves, the surface of one half cooperating with the surfaces of said other half to maintain said halves in alignment.

7. The coupling device of claim 2, wherein said additional parallel aperture is formed with a circumferentially extending groove and further including a pin means for insertion in said groove and through said shaft when said shaft is disposed in said additional aperture.

* * * * *